United States Patent
Sato et al.

(10) Patent No.: US 7,840,341 B1
(45) Date of Patent: Nov. 23, 2010

(54) SCHEDULE SETTING AND PROCESSING SYSTEM

(75) Inventors: Koji Sato, Toyota (JP); Masafumi Kizu, Toyota (JP); Makoto Morita, Toyota (JP); Masanobu Yamashita, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 08/750,641

(22) PCT Filed: Dec. 1, 1995

(86) PCT No.: PCT/JP95/02459

§ 371 (c)(1),
(2), (4) Date: Dec. 16, 1996

(87) PCT Pub. No.: WO96/17315

PCT Pub. Date: Jun. 6, 1996

(30) Foreign Application Priority Data

Dec. 1, 1994 (JP) .................................. 6/298290

(51) Int. Cl.
*G01C 21/00* (2006.01)
(52) U.S. Cl. ........................ 701/202; 701/201; 701/208; 705/6; 705/7; 705/5; 705/8; 705/9
(58) Field of Classification Search .................. 705/5–9, 705/26–27; 701/201–202, 209, 120, 117, 701/208; 340/995, 990; 364/130; 703/13, 703/22; 718/100; 707/999.01
See application file for complete search history.

(56) References Cited

U.S. PATENT DOCUMENTS 4,774,671 A * 9/1988 Itoh et al. .................... 701/208

(Continued)

FOREIGN PATENT DOCUMENTS

CN 1090666 A 8/1994

(Continued)

OTHER PUBLICATIONS

Internet booking system. Web venturas, Datalex Communications USA, Inc . 1998.*

(Continued)

*Primary Examiner*—Cuong Nguyen
(74) *Attorney, Agent, or Firm*—Kenyon & Kenyon LLP

(57) ABSTRACT

A system which automatically makes a travel plan by using on-vehicle or portable terminal. The system can prepare a travel plan in which the concrete destination and route are specified when rough positional and temporal conditions are inputted. The objective area and schedule inputted through the terminal are transmitted to an information center. At the information center, a basic frame of the travel meeting the received conditions is prepared. For a day trip, an example of the basic frame is "departure-walk-lunch-amusement park-night view-return". After the basic frame is prepared, concrete facilities meeting the actions are specified by making access to a data base. The specified facilities are inputted to the basic frame, and thus a concrete plan is completed. The completed plan is supplied to the terminal and displayed on a display to the persons who want to travel. The completed plan is further supplied to a navigation system and the system guides the persons in accordance with the plan.

9 Claims, 14 Drawing Sheets

U.S. PATENT DOCUMENTS

| | | | | |
|---|---|---|---|---|
| 4,862,357 A * | 8/1989 | Ahlstrom et al. | ............... | 705/6 |
| 4,951,212 A * | 8/1990 | Kurihara et al. | ............. | 701/208 |
| 5,006,985 A | 4/1991 | Ehret et al. | ..................... | 705/9 |
| 5,021,953 A * | 6/1991 | Webber et al. | .................. | 705/6 |
| 5,084,822 A * | 1/1992 | Hayami | ....................... | 701/212 |
| 5,237,499 A * | 8/1993 | Garback | .......................... | 705/5 |
| 5,243,529 A * | 9/1993 | Kashiwazaki | .............. | 701/208 |
| 5,272,638 A | 12/1993 | Martin et al. | ............... | 364/444 |
| 5,309,355 A * | 5/1994 | Lockwood | ...................... | 705/6 |
| 5,331,546 A * | 7/1994 | Webber et al. | ................. | 705/6 |
| 5,467,268 A | 11/1995 | Sisley et al. | .................... | 705/9 |
| 5,568,390 A | 10/1996 | Hirota et al. | ................ | 364/449 |
| 5,623,404 A | 4/1997 | Collins et al. | .................. | 705/9 |
| 5,757,289 A * | 5/1998 | Nimura et al. | ............. | 340/995 |
| 5,897,620 A * | 4/1999 | Walker et al. | .................. | 705/5 |
| 5,924,075 A * | 7/1999 | Kanemitsu | ..................... | 705/6 |
| 5,926,118 A * | 7/1999 | Hayashida et al. | .......... | 340/995 |
| 5,948,040 A * | 9/1999 | DeLorme et al. | ............ | 701/201 |
| 6,009,403 A * | 12/1999 | Sato | ............................. | 705/6 |
| 6,023,679 A * | 2/2000 | Acebo et al. | .................... | 705/5 |
| 6,304,850 B1 * | 10/2001 | Keller et al. | .................... | 705/5 |
| 6,801,226 B1 * | 10/2004 | Daughtrey | ................. | 715/763 |
| 6,895,381 B1 * | 5/2005 | Selby | ............................ | 705/6 |
| 7,363,242 B2 * | 4/2008 | Lewis et al. | ..................... | 705/5 |
| 7,409,643 B2 * | 8/2008 | Daughtrey | ................. | 715/763 |
| 7,418,409 B1 * | 8/2008 | Goel | ............................ | 705/26 |
| 7,472,080 B2 * | 12/2008 | Goel | ............................ | 705/26 |
| 7,529,681 B2 * | 5/2009 | Barnes et al. | ................ | 705/1.1 |
| 7,536,307 B2 * | 5/2009 | Barnes et al. | ................ | 705/1.1 |
| 7,613,622 B2 * | 11/2009 | Jindel | ............................ | 705/5 |
| 7,617,174 B2 * | 11/2009 | Chen et al. | .................... | 706/62 |

FOREIGN PATENT DOCUMENTS

| | | | |
|---|---|---|---|
| DE | 36 086 58 | A1 | 9/1986 |
| DE | 38 421 79 | A1 | 6/1989 |
| DE | 40 34 681 | | 5/1992 |
| DE | 40 34 681 | A1 | 5/1992 |
| EP | 0 286 105 | | 10/1988 |
| EP | 0 286 105 | A2 | 10/1988 |
| GB | 2 250 619 | | 6/1992 |
| GB | 2 250 619 | A | 6/1992 |
| JP | 61-87753 | U | 6/1986 |
| JP | 63-251900 | | 10/1988 |
| JP | 05-067151 | | 11/1988 |
| JP | 1-130299 | A | 5/1989 |
| JP | 2-032213 | A | 2/1990 |
| JP | 2-129800 | A | 5/1990 |
| JP | 2-141899 | A | 5/1990 |
| JP | 2-205712 | A | 8/1990 |
| JP | 2-278116 | A | 11/1990 |
| JP | 63-282879 | | 2/1991 |
| JP | 4-88600 | A | 3/1992 |
| JP | 4-213761 | | 8/1992 |
| JP | 4-299458 | | 10/1992 |
| JP | 5-071974 | A * | 3/1993 |
| JP | 5-313583 | | 11/1993 |
| JP | 06-125357 | | 3/1994 |
| JP | 03-036867 | | 5/1994 |
| JP | 6-223298 | | 8/1994 |
| JP | 8-075493 | * | 3/1996 |
| WO | WO 93/05492 | | 3/1993 |
| WO | WO 93/09511 | | 5/1993 |

OTHER PUBLICATIONS

Maps.com, www.maps.com, Geo Zone Route Planner, 1984-1999.*
Travel planning system (www.travelersnet.com), copyrigths 1996-1999, (it was sent in the first action).*
Makulowich, John, "Traveling by Virtual Reservation," Washington Technology, Jan. 23, 1997, p. 42, cited by others.*
"InforTravel Expands Service," Business Geographics, vol. 4, No. 6, Jun. 1996, p. 13, cited by others.*
DelRosso, Laura, "Firm Customizes Internet Res Link," Travel Weekly, vol. 55, No. 26, Apr. 1, 1996, pp. 43-44, 47, cited by others.*
Songjun Luo and Gang Yu, "On the Airline Schedule Perturbation Problem Caused by the Ground Delay Program", Transportation Science, vol. 31, No. 4, Nov. 1997, Institute for Operations Researchand the Management Sciences (1997), United States, cited by others.*
Shangyao Yan and Hwei-Fwa Young, "A Decision Support Framework for Multi-Fleet Routing and Multi-Stop Flight Scheduling", Transpn. Res.-A, vol. 30, No. 5, pp. 379-398, Elsevier Science Ltd. (1996), Great Britain, cited by other.*
Shangyao Yan and Yu-Ping Tu, "Multifleet routing and multistop flight scheduling for schedule perturbation", European Journal of Operational Research 103, pp. 155-169(1997), Elsevier Science B.V., United Kingdom, cited by other.*
Shangyao Yuan and Chung-Gee Lin, "Airline Scheduling for the Temporary Closure of Airports", Transportation Science, vol. 31, No. 1, pp. 72-82, Institute for Operations Research and the Management Sciences (1997) Taiwan, cited by other.*
Michael F. Arguello, Jonathan F. Bard, and Gang Yu "Models and Methods for Managing Airline Irregular Operations", Operations Research in the Airline Industry, pp. 1-45, Kluwer Academic Publishers (1998), United States, cited by other.*
"www.expedia.com". May 19, 2001. Obtained on Sep. 26, 2007 from www.Archive.org, cited by other.*
Multiperiod airline overbooking with a single fare class., Operations Research; Nov./Dc98, vol. 46 Issue 6, p. 805, 15p, cited by other.*
David L Margulius: Priced to sell . . . to you, Infoworld San Mataeo: Feb. 18, 2002, vol. 24, Iss. 7, p. 47-48, cited by other.*
Elmaghraby: Dynamic Pricing in the Presence of Inventory Considerations: Research Overview, Current Practices and Future Directions, Management Science 2003 Informs vol. 49, No. 10, Oct. 2003, pp. 1287-1309, cited by other.*
Boudreaux et al., "The fast changing world of the Internet", Management quarterly, v40n2, p. 2-19, 1999, cited by other.*
"Covia Adds Customization Tools Access Co.", Business Travel News, May 7, 1997 p. 12. Dialog File 16, Acc. No. 725978 2, cited by other.*
"Upgrading the System", Travel Agent, Jan. 10, 1994, p. 50. Dialog, File 16, Acc. No. 04883418, cited by other.*
Working Knowledge: Technology will dictate the continuing evolution of the role of agents and stimulate travel by informed consumers, Travel Agent, Mar. 21, 1994, p. 34; Dialog File 16 Acc. No. 05005272, cited by other.*
"Playing by the Rules: How Zenith Travel is using the new CRS regulations to develop better automation" Travel Agent, Jun. 28, 1993, p. 87, Dialog File 16 Acc. No. 04523256, cited by other.*
"Reservation Legacy (Unix-based reservations systems are discussed)", UNIX News, Jun. 1994, p. 17 Dialog File 16, Acc. No. 05141282, cited by other.*
"Netwise RPC Tool: Distributed Applications with Less Pain Netwise: Lanuches RPC distributing application tool" Network computing Maruch, 1991 p. 16, cited by other.*
Intelligent-Agent and Web-Service Based Service Composition for E-Business; Jing Chi; Junde Song; Electrical and Computer Engineering, 2007. CCECE 2007. Canadian Conference on; Digital Object Identifier: 10.1109/CCECE.2007.215; Publication Year: 2007, pp. 840-843.*
Dynamic Vehicle Routing Problems under Flexible Time Windows and Fuzzy Travel Times; Djadane, M. et al.; Service Systems and Service Management, 2006 International Conference on; vol. 2; Digital Object Identifier: 10.1109/ICSSSM.2006.320749; Publication Year: 2006 , pp. 1519-1524.*
Constructing an intelligent travel information platform based on Location Base Service; Hung, J.C. et al.; Pervasive Computing (JCPC), 2009 Joint Conferences on; Digital Object Identifier: 10.1109/JCPC.2009.5420067; Publication Year: 2009 , pp. 845-850.*
Sei-Tur: A System Based on Composed Web-Service Discovery to Support the Creation of Trip Plans; Schiel, U. et al.; Digital Society, 2007. ICDS '07. First International Conference on the; Digital Object Identifier: 10.1109/ICDS.2007.36 Publication Year: 2007 , pp. 28-28.*

Modelling Inbound Tourism Demand in Shanghai; Yuan Yujie; Wang Zheng; Management and Service Science, 2009. Mass '09. International Conference on; Digital Object Identifier: 10.1109/Icmss.2009.5300886; Publication Year: 2009 , pp. 1-4.*

Forecast of Tourism Emergency Events Based on Quantum Immune Clone Algorithm; Junping Du; You Tian; Bio-Inspired Computing: Theories and Applications, 2007. BIC-TA 2007. Second International Conference on Digital Object Identifier: 10.1109/BICTA.2007.4806449 ; Publication Year: 2007 , pp. 196-199.*

*Tripmaker 1996* Travelguide on CD-ROM, Rand McNally, IL, Sep. 14, 1995.

Patent Abstracts of Japan, vol. 12, No. 300, Aug. 16, 1988 & JP 63 073371, Fujitsu Ltd., Apr. 2, 1988.

Robotics, CIM and Automation, Emerging Technologies, San Diego, Nov. 9-13, 1992, vol. 2 of 3, Nov. 9, 1992, Institute of Electrical and Electronics Engineers, pp. 902-906, Abe K. et al: *A Planning Method combining Rule-Bases and Optimization Algorithms for Transportation Network*.

Management Science, vol. 25, No. 12, Dec. 1979, USA, pp. 1197-1207, Zoltners A.A. et al.: *An Optimal Algorithm for Sales Representative Time Management*.

IBM Technical Disclosure Bulletin, vol. 37, No. 4A, Apr. 1, 1994, p. 567, *Entertainment Guide Enabling*.

Proceedings of the Vehicle Navigation and Information Systems Conference (VNIS), Toronto, Sep. 11-13, 1989, Conf. No. 1, Sep. 11, 1989, Reekie D; Case E.; Tsai J., pp. 475-483, Tsuzawa M. et al.: *Advanced Mobile Traffic Information and Communication system—AMTICS*.

H. Suzuki et al.: *A Travel Consultation System: Towards a Smooth Conversation in Japanese*, Lecture Notes in Computer Science, vol. 221, 1986, pp. 226-235.

Base et al: *Globe-Trotter, An Intelligent Flight Itinerary Planner*, IEEE Expert, IEEE Inc., New York, US, 1989, pp. 56-64.

Takasaki et al.: *Research in Vehicle Systems at General Motors*, Vehicle navigation and Information Systems Conference, 1989, Conference Record Toronto, Ont., Canada Sep. 11-13, 1989, New York, NY, USA, IEEE, US, Sep. 11, 1989, pp. 250-254.

Sweeney, Jr.: *An Overview of Intelligent Vehicle Highway Systems*(IVHS), WESCON/'93, conference record, san francisco, Ca, usa, Sep. 28-30, 1993, New York, NY, USA, IEEE, US, Sep. 28, 1993, pp. 258-262.

M. Tsuzawa, et al.: *Advanced Mobile Traffic Information and Communication System—AMTICS*, Japan Traffic Management Technology Association, 1989 IEEE, pp. 475-483.

* cited by examiner

Fig. 7

1 WALK
2 LUNCH
3 AMUSEMENT PARK
4 NIGHT VIEW

Fig. 8

1 THEME PARK
2 LODGING
3 AQUARIUM
4 LUNCH
5 ART GALLERY

Fig. 9

| FACILITY OVERVIEW | TYPE |
|---|---|
| #1 WALK | #105 |
| #2 LUNCH | #231 |
| #3 AMUSEMENT PARK | #355 |
| #4 NIGHT VIEW | #487 |

| FACILITY OVERVIEW | TYPE | RECOMMENDED PLAN |
|---|---|---|
| #1 WALK | #105 | YAMASHITA PARK |
| #2 LUNCH | #231 | CHINATOWN XX |
| #3 AMUSEMENT PARK | #355 | DISNEYLAND |
| #4 NIGHT VIEW | #488 | YOKOHAMA BAY BRIDGE |

Fig. 15(A)

- TRAVEL/DRIVE START (TRANSMIT) — S401
- RECEIVE — S402
- STATUS AT DEPARTURE TIME (TRANSMIT) — S403
- RECEIVE — S404
- DISPLAY — S405
- SET USER REQUEST (TRANSMIT) — S406

Fig. 15(B)

- RECEIVE — S501
- WATCH START — S502
- VERIFY WITH SCHEDULE — S503
- ELAPSE OF A CERTAIN TIME PERIOD — S504
- VEHICLE POSITION INFORMATION REQUEST (TRANSMIT) — S505
- RECEIVE — S506
- WEATHER & TRAFFIC INFORMATION CHECK? — S507 (OK / NG)
- DETERMINE INFLUENCE ON SCHEDULE? — S508 (NO INFLUENCE / YES)
- INFORMATION BULLETIN AT INFRASTRUCTURE SIDE (TRANSMIT) — S509
- RECEIVE — S510
- SCHEDULE CHANGE REQUEST? — S511 (NO / YES)
- SCHEDULE RESET — S512

SCHEDULE SETTING AND PROCESSING SYSTEM

This application is a U.S. national stage application filed under 35 U.S.C. §371 of PCT/JP95/02459 filed Dec. 1, 1995.

TECHNICAL FIELD

This invention relates to a system for automatically preparing a schedule that matches the entered requirements and is applicable to systems retrieving data from a database that stores travel or drive information, and setting or preparing a travel schedule for a traveler, travel planner, driver, and so forth.

BACKGROUND ART

In recent years, information I/O devices have been installed in vehicles, and mobile communication systems have been proposed to perform data communications between such I/O devices and an information management center. Using this sort of mobile communication system while in a vehicle, the idea is to perform a variety of services, such as restaurant reservations.

For example, in the reservation system from a vehicle-mounted terminal disclosed in Japanese Patent Laid-Open Publication No. Hei 4-213761, a configuration is proposed that specifies a service shop based on the position information of multiple service shops, road traffic jam information, vehicle position information, road map information, and the service shop and desired visiting time thereof selected by the vehicle passenger, and calculates the estimated time of arrival at the service shop. Namely, from the desired visiting time entered by the user and the current time, the time required until the desired visiting time is calculated, and the distance that can be reached by the desired time is calculated from the required time and road traffic jam information. Then, the reachable place names are determined from this distance information and transmitted to the information center. At the information center, a list of applicable service shops based on this data is prepared and transmitted in reply to the vehicle. The user selects a desired shop from the displayed list of service shops and the selection is transmitted to the information center. When this data is received at the information center, the reservation data, such as an ordered item or arrival time, is transferred to the selected service shop. According to this configuration, some situations can be avoided, such as when a specific restaurant is reserved and the arrival time is delayed excessively due to the road being congested beyond expectation, thereby enabling optimum service for the vehicle passenger.

However, enjoyment of a motoring excursion includes situations when one desires not just to reach a certain final location within a prescribed time period, but to visit multiple facilities within a prescribed time period. For example, a driving plan may include visits to a zoo, amusement park, sightseeing spots, and so forth, which end in returning home the same day. In the aforementioned prior art, this sort of schedule for visiting multiple facilities within a prescribed time period can not be planned. Furthermore, for some travelers, there are instances where no specific facilities have been specified and the only thing that has been decided is the purpose of the trip (for example, sightseeing or family outing). In this case as well, it is impossible to automatically prepare a schedule fitting the travel purpose.

Furthermore, even after the expected time of arrival was calculated and a service shop was specified, an instance may arise where the schedule including the specified service shop becomes unsuitable, possibly as a result of changes in road conditions or weather. In such a case, a problem arises in that schedule revisions, such as reservation cancellations or reservation time modifications for the service shop, are not performed in the aforementioned prior art invention, and the user must revise the schedule by again inputting the requirements and making new reservations.

SUMMARY OF THE INVENTION

This invention intends to solve the problems of the aforementioned prior art. The first object is to automatically prepare and present to the user a schedule for visiting multiple places (such as facilities, shops, sightseeing spots, lodging destinations, and return destination) simply by inputting general requirements. The second object is to evaluate the feasibility of the present schedule, and, if it is not feasible, to again prepare a schedule to meet the user's requirements.

To achieve the aforementioned objects, this invention, a schedule-set-up management system, comprises an inputting means for inputting at least a position requirement and a time requirement, a frame preparing means for preparing a basic frame of a schedule including the types of intermediate and final locations and the order of transfer based on the aforementioned position requirement and time requirement, and a schedule preparing means for preparing the schedule wherein the intermediate and final locations are specified by accessing a database and retrieving specific facilities fitting the prepared aforementioned basic frame.

In one mode of the invention, the aforementioned frame preparing means select a basic frame fitting the aforementioned position requirement and time requirement from among multiple basic frames stored beforehand in a memory device, to become the basic frame of the schedule.

In another mode of the invention, the aforementioned inputting means and frame preparing means are provided in a terminal device, the aforementioned schedule preparing means are provided in a host device, the terminal device and host device are connected via a communication line, the terminal device transmits the prepared basic frame to the host device, and the host device transmits the prepared schedule to the terminal device. Furthermore, this terminal device has a display means for displaying a touch switch for inputting the aforementioned position and time requirements, the aforementioned prepared basic frame, and the transmitted schedule. The terminal device disconnects the communication line with the host device after transmitting the basic frame, and reconnects the communication line with the host device and receives a schedule after schedule preparation is complete.

In another mode of the invention, the schedule-set-up management system further comprises a route-searching means for searching an optimum route to implement the aforementioned schedule based on map data.

In another mode of the invention, the schedule-set-up management system further comprises a watching center for watching the implementation of the aforementioned schedule, wherein the aforementioned schedule-preparing means again prepare a schedule based on information from the aforementioned watching center. The aforementioned watching center comprises an information-obtaining means for obtaining position information of a schedule implementer, information of the intermediate locations in the schedule, and information on traffic conditions between intermediate facilities, and supplies the obtained information to the schedule-preparing means. The aforementioned information-obtaining means of the aforementioned watching center further obtains weather information and supplies it to the schedule-preparing means. The aforementioned schedule-preparing means evaluate the degree of influence the information from the aforementioned watching center will have on schedule implementation, and again prepare a schedule based on the evaluation result.

BRIEF DESCRIPTION OF DRAWINGS

FIG. 7 shows an example basic frame when an itinerary is a day trip.

FIG. 8 shows an example basic frame when an itinerary is an overnight trip.

FIG. 9 shows type codes for the basic frame shown in FIG. 7.

FIG. 15 is a processing flowchart after schedule implementation in the system of FIG. 13.

DETAILED DESCRIPTION

The embodiments of this invention are described with reference to the drawings.

First Embodiment

Figure 1:
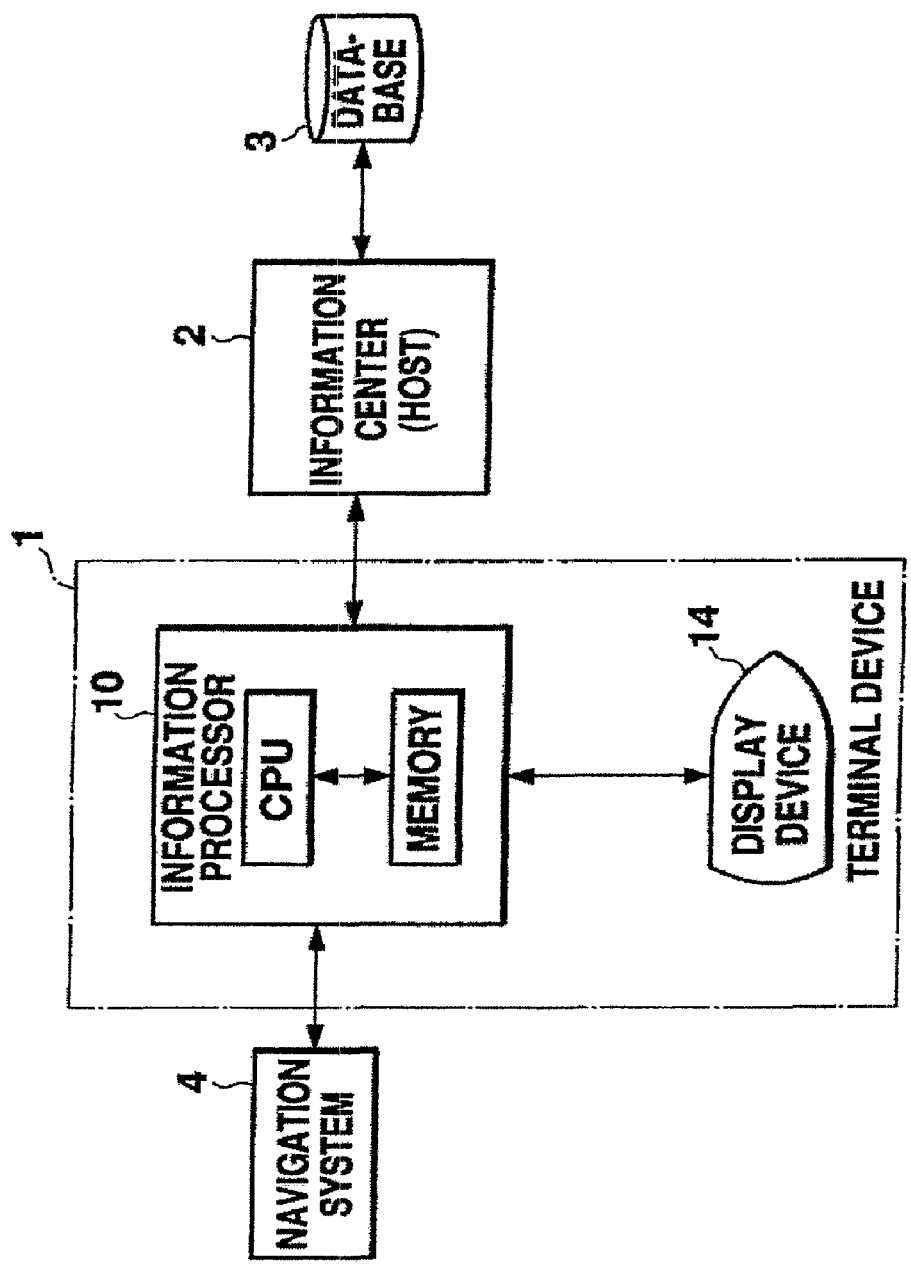
FIG. 1 is a system block diagram of an embodiment of this invention.

FIG. 1 shows a system block diagram of this embodiment. An information processor 10, comprising a CPU and memory, requests an information center 2 to prepare a schedule. The information center 2 that received the request accesses a database 3 to obtain the necessary information for schedule preparation and prepares a specific schedule. The prepared schedule is sent to the information processor 10. The information processor 10 displays the received schedule on display device 14 for presentation to the schedule implementer, such as an intended driver or traveler. Display device 14 not only displays the prepared schedule but also functions as an input device for displaying touch switches and inputting the necessary requirements for schedule preparation. The display on display device 14 is controlled by information processor 10. In FIG. 1, information processor 10 and a navigation system 4 are connected so that the prepared schedule is supplied to navigation system 4. This is done to implement the schedule using navigation system 4. Navigation system 4 has a known configuration having main components of a memory for storing map data, a current position detection device (GPS, etc.), and a processor for comparing the current location and guide route and guiding the vehicle via a screen display or voice.

In this embodiment, information processor 10 and display device 14 are carried in the vehicle and function as a terminal device 1. They are connected to information center 2, which functions as a host device, through a car telephone line. Naturally, display device 14 can be carried by itself in the vehicle as a terminal device, and information processor 10 and information center 2 can be configured as a host device. However, in this case, a CPU, memory, and communication device are required in display device 14. Furthermore, not only the functions of information processor 10 and display device 14, but also those of the information center and database may be carried entirely in the vehicle. However, this case will result in an increase in memory capacity and an increase in processing at the CPU.

Figure 2:
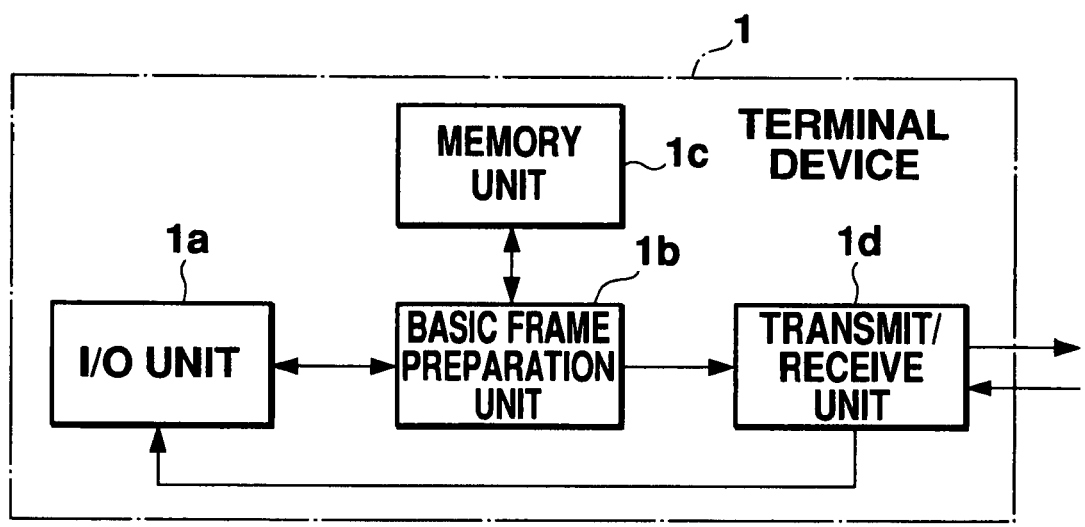
FIG. 2 is a block diagram of terminal device 1 shown in FIG. 1.

FIG. 2 shows a functional block diagram of terminal device 1. An I/O unit 1a is configured by display device 14, and the intended driver, for example, inputs the necessary requirements for schedule preparation by actuating the touch switches. The requirements to be input are the position requirements, such as the desired destination areas, and the time requirements, such as the desired time frame. As a specific example, an extremely general requirement is sufficient, such as "I'd like to go with the family on a day trip somewhere". The requirement data that is input at I/O unit 1a is supplied to a basic frame preparation unit 1b. Basic frame preparation unit 1b is configured by the CPU and prepares the basic frame for the schedule based on the input requirement. The basic frame preparation is performed by selecting a pattern fitting the input requirement from among multiple basic frame patterns stored beforehand in a memory unit 1c. The prepared basic frame is supplied in the form of a schedule preparation program to a transmit/receive unit 1d where it is sent to information center 2. At information center 2, the prepared schedule that was sent is received by transmit/receive unit 1d and displayed on I/O unit 1a.

Figure 3:
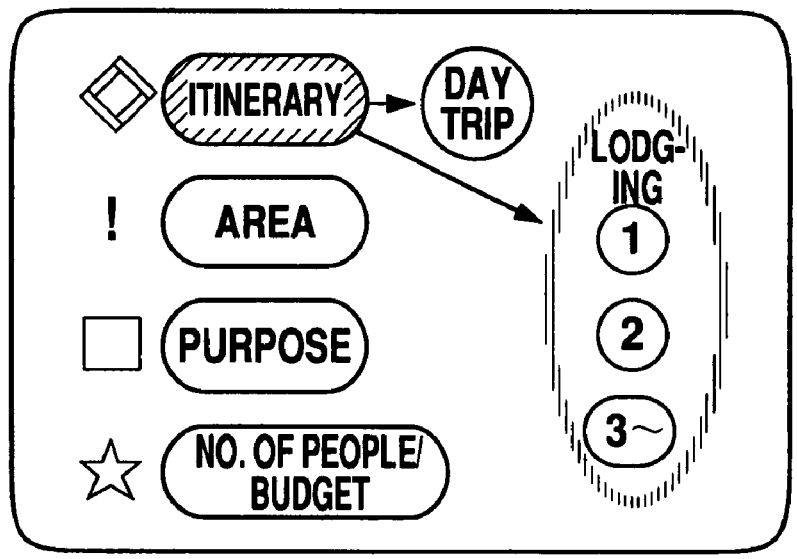
FIG. 3 shows one example of the requirement input screen.

FIG. 3 shows an example of a screen when I/O unit 1a (display device 14) is used to input the requirements. In the initial state, the screen displays touch switches for "itinerary", "area", "purpose", and "no. of people/budget". When the intended traveler actuates the "itinerary" switch, for example, touch switches for "day trip" and "lodging" are displayed next so that the time requirement can be input. When the "area" touch switch is actuated, the screen switches to a map screen or a character input screen so that a desired general destination area, such as "Tokyo Bay Area", for example, can be input for the position requirement. When the "purpose" touch switch is actuated, the screen switches to a requirement input screen with "outdoor", "indoor", and "recreational facility", for example, so that the purpose of the trip can be input. When the "no. of people/budget" touch switch is actuated, the screen switches to a requirement input screen with the number of intended travelers, their make up, and "less than 3,000 yen", "within 5,000 yen", "within 10,000 yen", and "unlimited" so that the number of people and the budget can be input.

Figure 4:
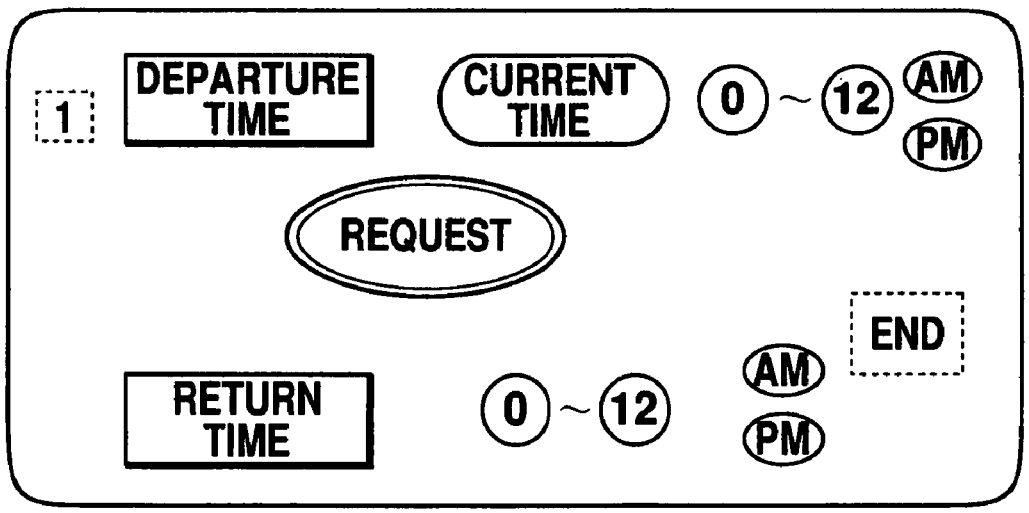
FIG. 4 shows the screen following the screen shown in FIG. 3.

FIG. 4 shows an example of a screen when the "day trip" switch is actuated. Touch switches for "departure time", "current time", and "return time" are displayed together with a numeric keypad so that these time requirements can be input. The "request" switch at the center of the screen is used when requesting the information center to prepare a schedule without specifying, for example, a return time. Therefore, it is easy to input requirements, such as "a day trip for two by car to the Tokyo Bay Area within 10,000 yen and no specific return time". Once the requirements have been input, the "end" switch is actuated to complete the requirement setting. If the "lodging" switch in the screen of FIG. 3 and then the "end" switch are actuated, the requirement set-up screen is displayed for the next day (refer to the number on the left side of the screen).

Figure 5:
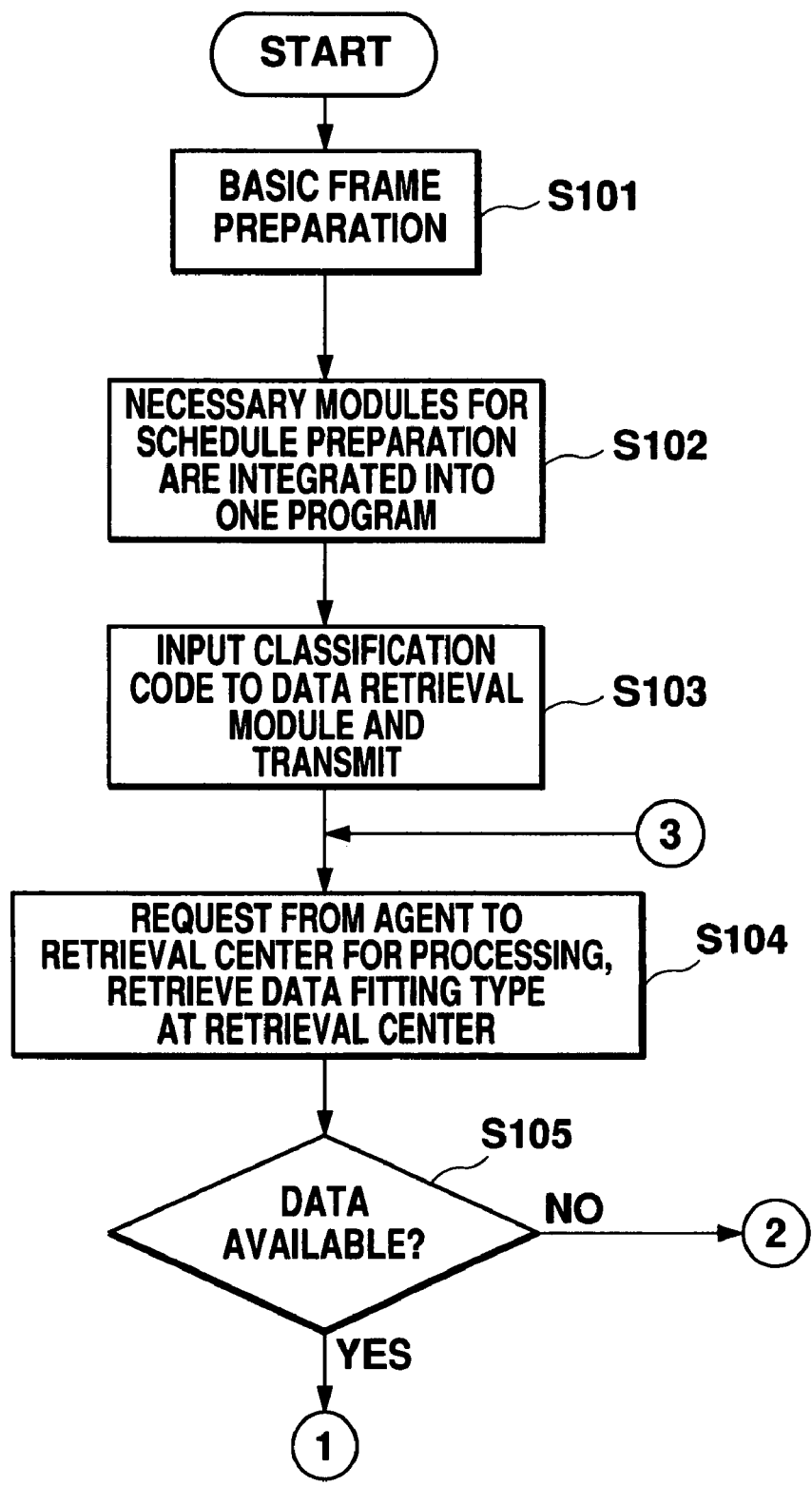
FIG. 5 shows a processing flowchart for schedule preparation.
Figure 6:
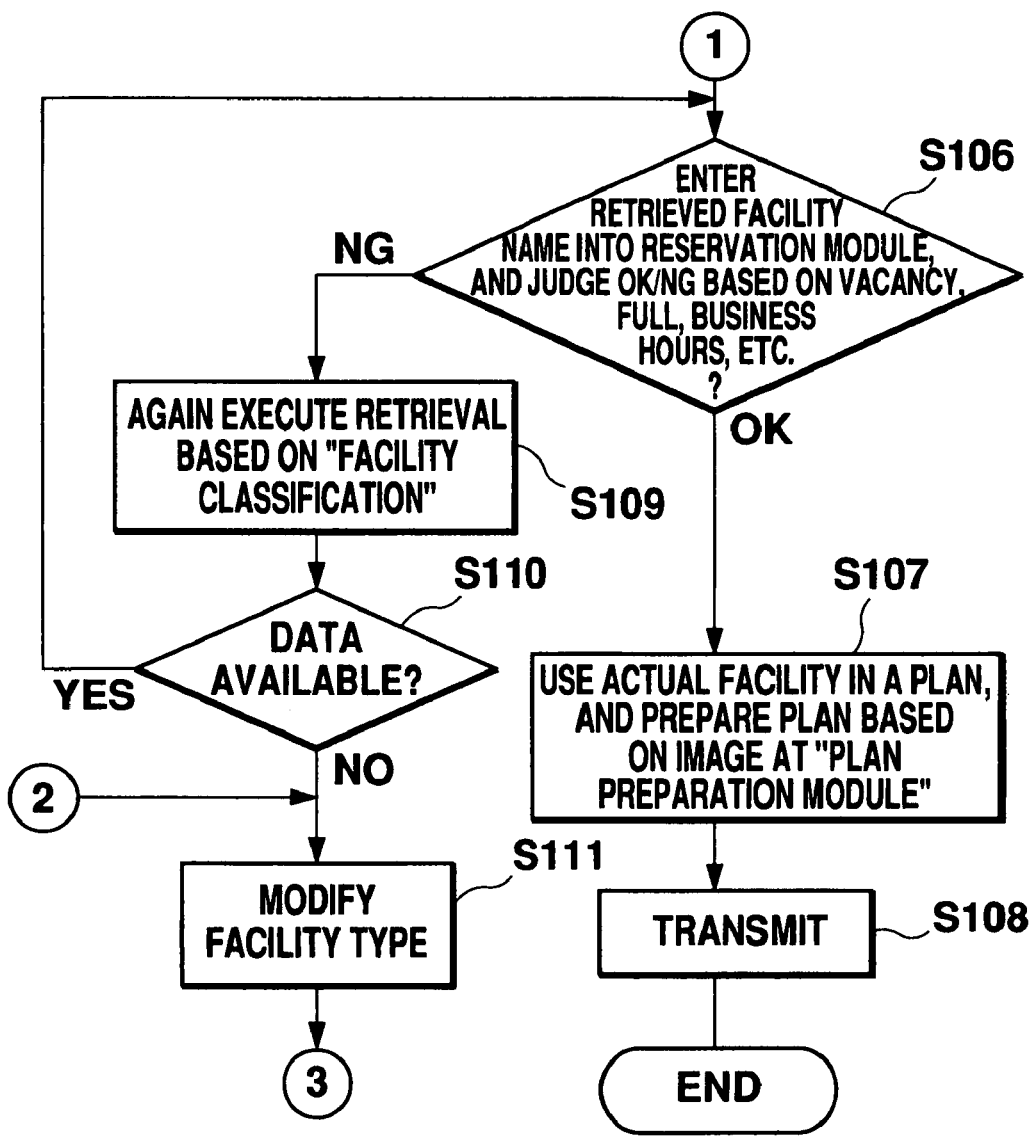
FIG. 6, together with FIG. 5, shows a processing flowchart for schedule preparation.

FIG. 5 and FIG. 6 show processing flowcharts from requirement entry to schedule preparation. S101 is a processing for terminal device 1 where a basic frame of a schedule is prepared by selecting the basic frame from predetermined basic frame patterns fitting the input requirements, namely, number of people, area, purpose, budget, departure time, arrival time, and so forth. FIG. 7 shows one basic frame pattern for a "day trip" that was selected from among multiple basic frame patterns stored beforehand in memory unit 1c, and composed of "walk", "lunch", "amusement park", and "night view". In other words, this basic frame pattern comprises a walk after departure, then a lunch, followed by a trip to an amusement park, and finally enjoyment of a night view before returning back. On the other hand, FIG. 8 shows one basic frame pattern for "lodging" that was selected from among multiple basic frame patterns stored beforehand in memory unit 1c, and composed of "theme park", "lodging", "aquarium", "lunch", and "art gallery". In other words, this basic frame pattern comprises a trip to a theme park after departure and staying overnight at a lodging to end the day. On the next day, the pattern comprises a trip to an aquarium, followed by a lunch, and finally a visit to an art gallery before returning back. The numbers of the items in FIG. 7 and FIG. 8 denote the order of transfer. Each item is sorted in detail, and walk, for example, is provided with 100 types of walks. Each of these 100 types of walks is assigned a facility-type code number from 00 to 99. From these 100 types of walks, the walk that fits the input requirements is selected for the basic frame. For example, "00" is a family-oriented walk passing through places a, b, and c, and "01" is a walk oriented for one person passing through places a, e, and c. The facility-type code for a walk oriented for two persons is "05", a "literature course" passing through places a, f, and c. A tower structure having many tenants may also be added to the facilities suitable for walking.

Figure 10:
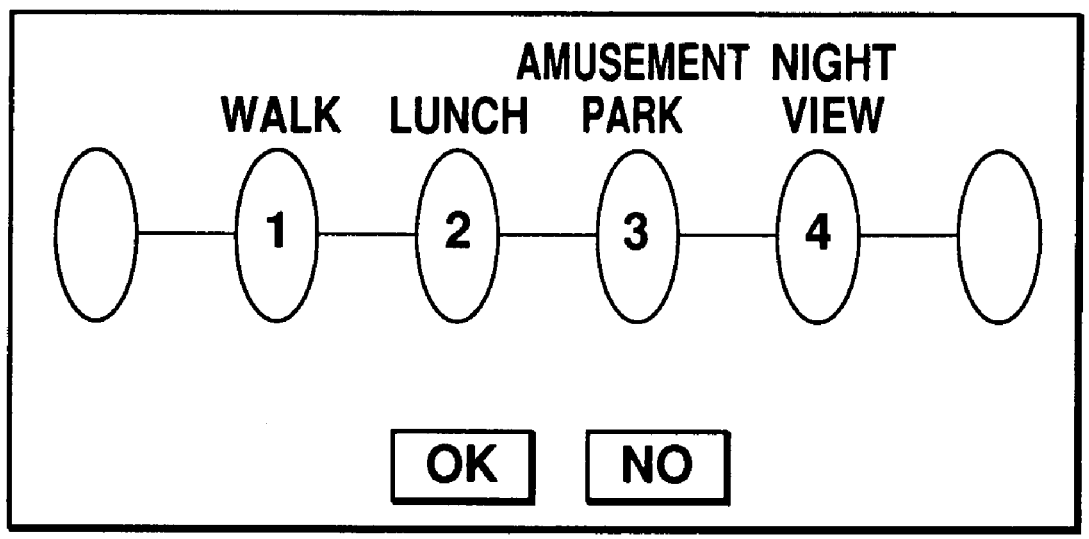
FIG. 10 shows a display screen for the prepared basic frame.

FIG. 9 shows one example of a basic frame for a "day trip" that was prepared in this manner. The facility-type codes are "105, 231, 355, and 487", and they signify the following:

departure→first walk→second lunch→third amusement park→fourth night view→return back After the basic frame is prepared, basic frame preparation unit 1b displays the basic frame on I/O unit 1a (display device 14) as a schedule outline. FIG. 10 shows one example of this display, and touch switches "OK" and "NO" are displayed at the bottom of the outline. The intended traveler actuates the "OK" switch if the schedule is suitable or the "NO" switch if it is not. If the intended driver actuates the "NO" switch, basic frame preparation unit 1b again prepares a new basic frame for presentation.

Returning back to FIG. 5, if the basic frame is prepared and the intended driver actuates the "OK" switch, information processor 10 next transfers execution to S102 where the modules necessary for schedule preparation are prepared into a single program. The modules necessary for schedule preparation comprise the data retrieval module, reservation module, and schedule preparation module. The data retrieval module is a program that accesses a database and retrieves information on whether any specific facility-corresponding to the facility type codes described above is available. When a reservation is required for a specific facility retrieved by the data retrieval module, the reservation module is the program that checks whether a reservation is possible and makes the reservation accordingly. When, as a result of the executions of the data retrieval module and reservation module, all facilities in the basic frame are specified, the schedule preparation module is the program that completes them as a single schedule. After the modules are prepared as a single program, information processor 10 transfers execution to S103 where the facility-type codes in the basic frame that was prepared by S101 are input into the data area of the data retrieval module within the program, and transmitted to information center 2 as a program for schedule preparation. The processing at the terminal side ends for the time being with these processes S101 to S103, at which time terminal device 1 disconnects the communication line from information center 2.

Figures 11, 12:
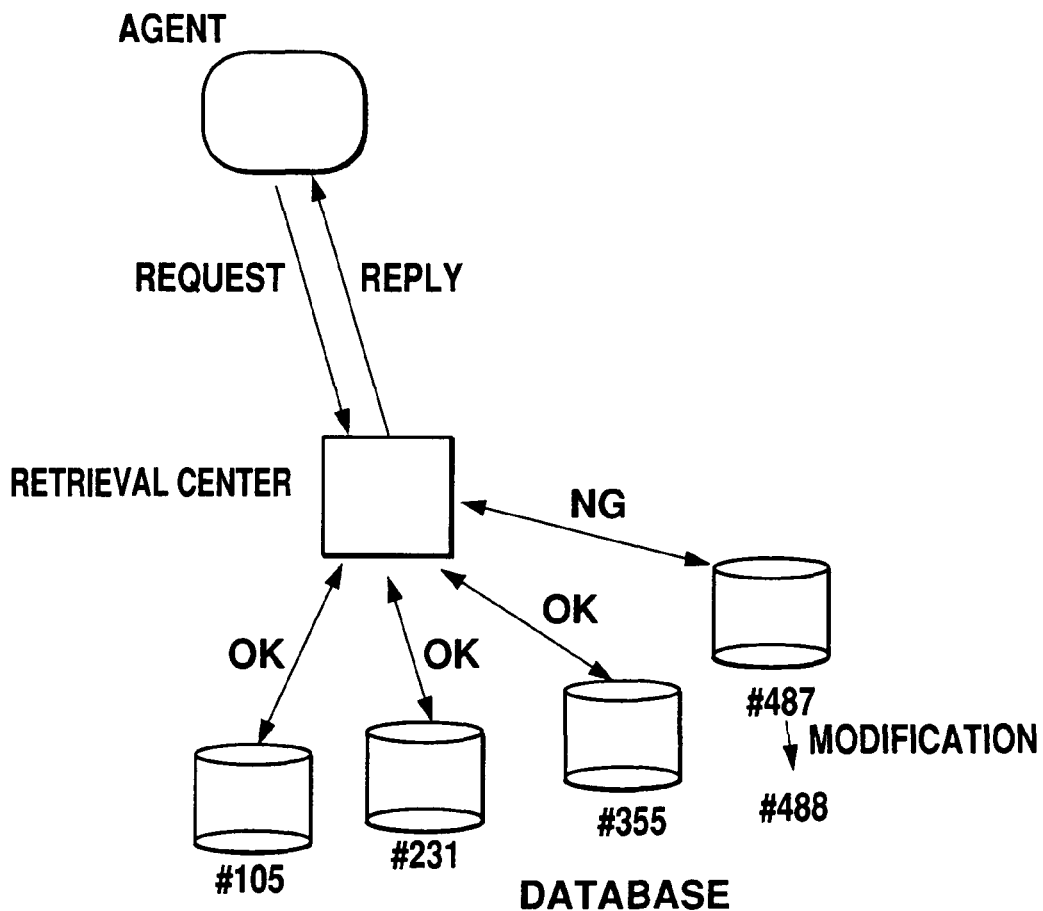
FIG. 11 is a conceptual diagram of the schedule preparation process.
FIG. 12 shows the prepared schedule.

On the other hand, information center 2 executes these programs received for schedule preparation. In other words, information center 2 functions as an agent for terminal device 1 and, instead of terminal device 1, prepares the schedule. Specifically, the execution first transfers to S104 and the data retrieval module is executed. Information center 2, which serves as an agent, performs this execution upon receiving a reply to a request for processing, to the retrieval center, which performs retrieval. At this retrieval center, specific facilities fitting the facility-type codes that were sent are retrieved from the database, and the data for facilities fitting the codes, if any, is transmitted in reply to information center 2. If no facility fits, a reply is sent to that effect. Taking the facility-type codes shown in FIG. 9 as examples there are four codes #105, #231, #355, and #487, and the retrieval center retrieves specific facilities corresponding to these four codes from the database. FIG. 11 shows a typical processing for S104. Information center 2, which serves as an agent, sends the facility-type code data to the retrieval center and requests a retrieval. The retrieval center accesses databases for every type and retrieves the corresponding facilities. The retrieval result is sent to information center 2. In the figure, facilities corresponding to codes #105, #231, and #355 exist so a reply of "OK" is sent. However, no facilities corresponding to #487 exist so a reply of "NG" is sent.

Returning again to FIG. 5, when the replay is received from the retrieval center, the execution transfers to S105, and information center 2 judges whether data exists based on the reply. If the reply is "OK", data exists and the execution transfers to S106 of FIG. 6. On the other hand, if data does not exist, the execution transfers to S111 of FIG. 6, the facility-type code is modified, and the processing for S104 is repeated. When this type code is modified, it is modified to a code having a relatively similar facility type. For example, since no facilities exist for code #487, the type code is modified to #488 and the retrieval is repeated. Specifically, code #487 is a night view of a harbor vicinity, and, since the parking lot is full, the type code is modified, such as to #488 for a hill having a night view. If a corresponding facility exists as a result of the repeated retrieval, the execution transfers to the processing of S106 of FIG. 6.

At S106, information center 2 transfers execution to the reservation module. In other words, a facility name obtained from the retrieval is input into the data area of the reservation module, and a request is sent to the reservation center to determine the availability of a reservation. The reservation center accesses the requested facility, makes a reservation, and sends a reply of the result to the information center. This request and reply are identical to those during the retrieval shown in FIG. 11. Furthermore, since there are instances where reservations cannot be made depending on the facility, the necessity of a reservation is judged when data is input by the reservation module. A restaurant, for example, is judged to be a facility generally requiring a reservation while an amusement park is not. If a facility requires a reservation and a reservation was made (OK), the schedule preparation module is executed and a final schedule is prepared. Specifically, the facilities specified by S103 to S106 are input to the various facilities of the basic frame to become a specific schedule. Then, the schedule prepared in S108 is transmitted to terminal device 1. On the other hand, if a reservation was not possible even though one was required (NG), S109 sends a request to the retrieval center to retrieve another facility having the same facility type code and the retrieval is repeated. Then, S110 judges whether a corresponding facility exists. If a facility exists, the processing of S106 is again repeated, and if a corresponding facility does not exist, the execution transfers to S111 and the facility-type code is modified. After the facility-type code is modified, the processing from S104 is again repeated.

FIG. 12 shows one example of a schedule that was prepared through this sort of processing. The walk, lunch, amusement park, and night view are respectively specified by "Yamashita Park", "Chinatown's XX", "Disneyland", and "Yokohama Bay Bridge". Once this sort of schedule is prepared, information center 2, which is a host device, re-connects a communication line with terminal device 1 and transmits the prepared schedule to terminal device 1. The schedule is supplied to navigation system 4 where calculations are performed to search for a route following the schedule and the route obtained from the search is presented to the intended traveler. Therefore, the intended traveler can easily obtain a specific travel schedule simply by inputting extremely general requirements. Furthermore, if time is required in the schedule preparation, unnecessary communication costs are not incurred since the communication line between the terminal device and host device is disconnected during schedule preparation.

Second Embodiment

Figure 13:
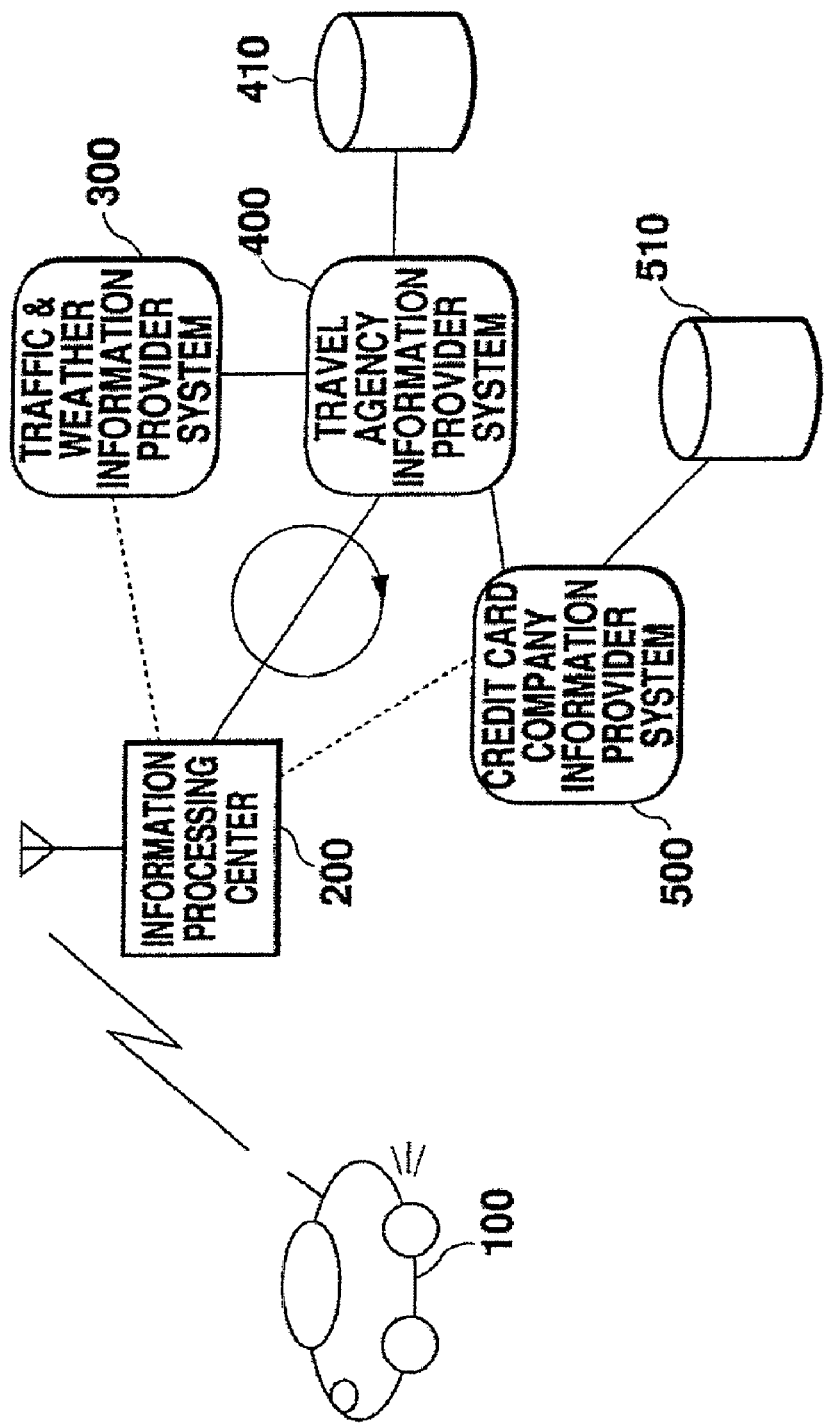
FIG. 13 is a system block diagram of another embodiment of this invention.

FIG. 13 shows a system block diagram of this embodiment. As in the first embodiment, terminal device 1 is provided in a vehicle 100, and transmits prescribed information to an information processing center 200 using a car telephone line and receives and outputs the information sent from information processing center 200. On the other hand, information processing center 200, which received the information from vehicle 100, inputs information from various information provider systems connected to information processing center 200, such as a traffic & weather information provider system 300, a travel agency information provider system 400, and a credit card company information provider system 500, and edits a schedule fitting the requirements requested by vehicle 100 and transmits it to vehicle 100. Traffic & weather information provider system 300 connects to road beacons, for example, and supplies information regarding road conditions, traffic jams, and weather to information processing center 200. Travel agency information provider system 400 transmits travel related information stored in a database 410, such as lodging facilities and sightseeing, to information processing center 200. Credit card company information provider system 500 transmits various service shop information stored in a database 510, such as restaurants, to information processing center 200. Information processing center 200 sets up a schedule based on these various types of information, and when it is judged that the schedule should be modified according to the current location of vehicle 100 or according traffic or weather information from traffic & weather information provider system 300, transmits modification information, such as a new schedule, to vehicle 100.

Figures 14A, 14B:
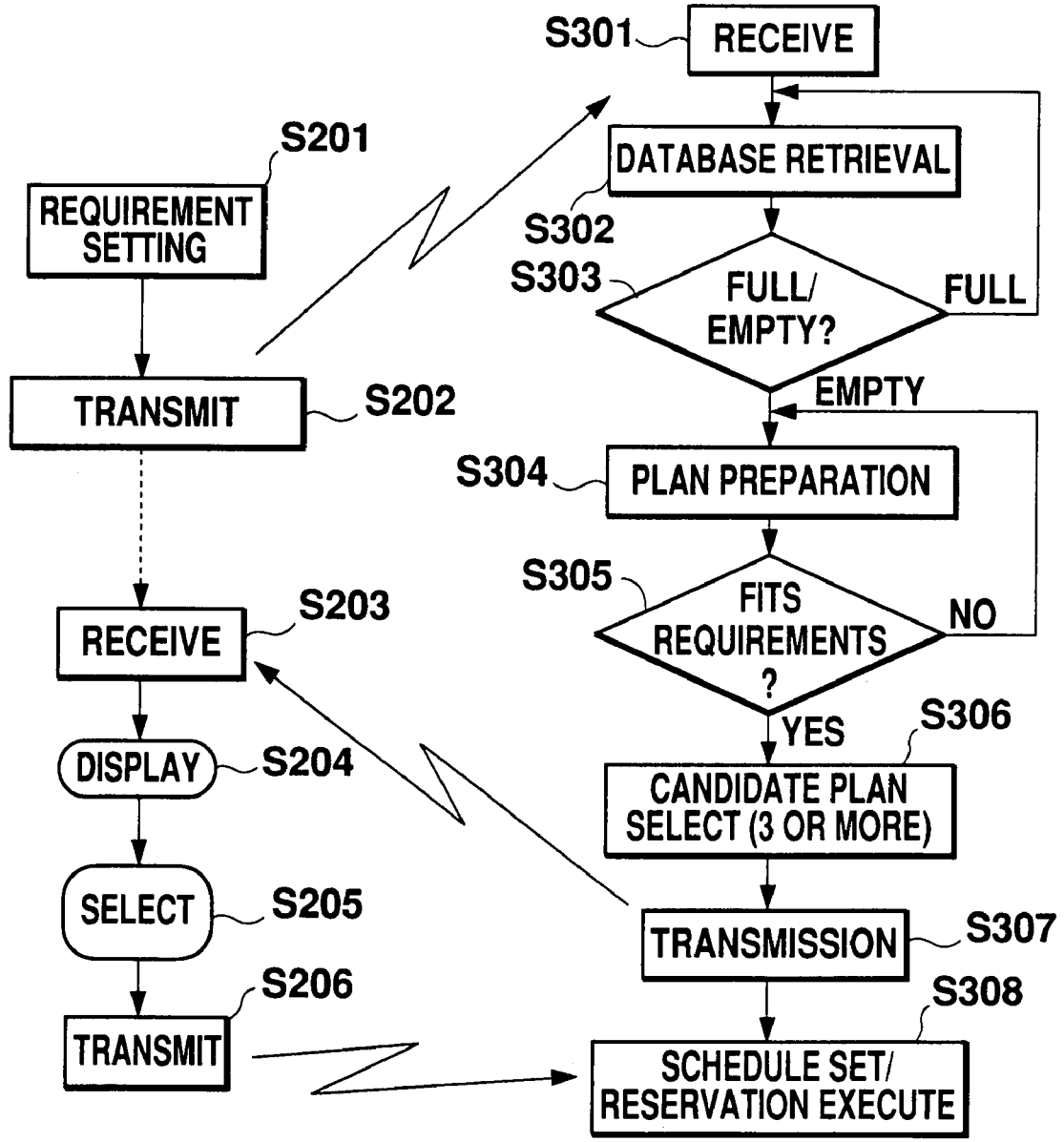
FIG. 14 is a processing flowchart of the schedule preparation in the system of FIG. 13.

This system is configured as described above and the operation thereof is described in detail using the flowcharts in FIG. 14 and FIG. 15.

FIG. 14 shows the processing at vehicle 100 and information processing center 200, where FIG. 14 (A) shows the processing at vehicle 100 and FIG. 14 (B) the processing at information center 200. At vehicle 100, the user (vehicle driver) first inputs the position requirement and time requirement necessary for schedule preparation. In addition to these requirements, other requirement settings can be provided, such as the travel distance from home. Furthermore, instead of touch switches, a joystick type of control can be used to permit the requirements to be easily input from the passenger-side or back seats. When the requirement setting necessary for the schedule is completed (S201), vehicle 100 transmits these requirements (S202) out through the antenna of the car telephone.

On the other hand, information processing center 200 receives (S301) the requirement data transmitted from vehicle 100, then retrieves (S302) from the databases of information provider systems 300 through 500, and judges (S303) whether a specific facility exists fitting the requirements transmitted from vehicle 100 as detailed in the first embodiment. Specifically, information processing center 200 makes an inquiry as to availability to travel agency information provider 400 or credit card company information provider 500, inquiries as to availability are then made to lodging facilities and service shops having contracts with these information provider systems, and a reply is next sent to information processing center 200. If a lodging facility or service shop is available, a plan (schedule) is prepared using these devices (S304), and it is judged (S305) whether the prepared plan fits the requirements transmitted from vehicle 100. This judgment is performed by presenting the plan to the intended traveler and receiving a reply of OK or NO with respect to the plan. If plans fitting the requirements exist, three or more plan choices are selected (S306) and transmitted to vehicle 100.

Figure 16:
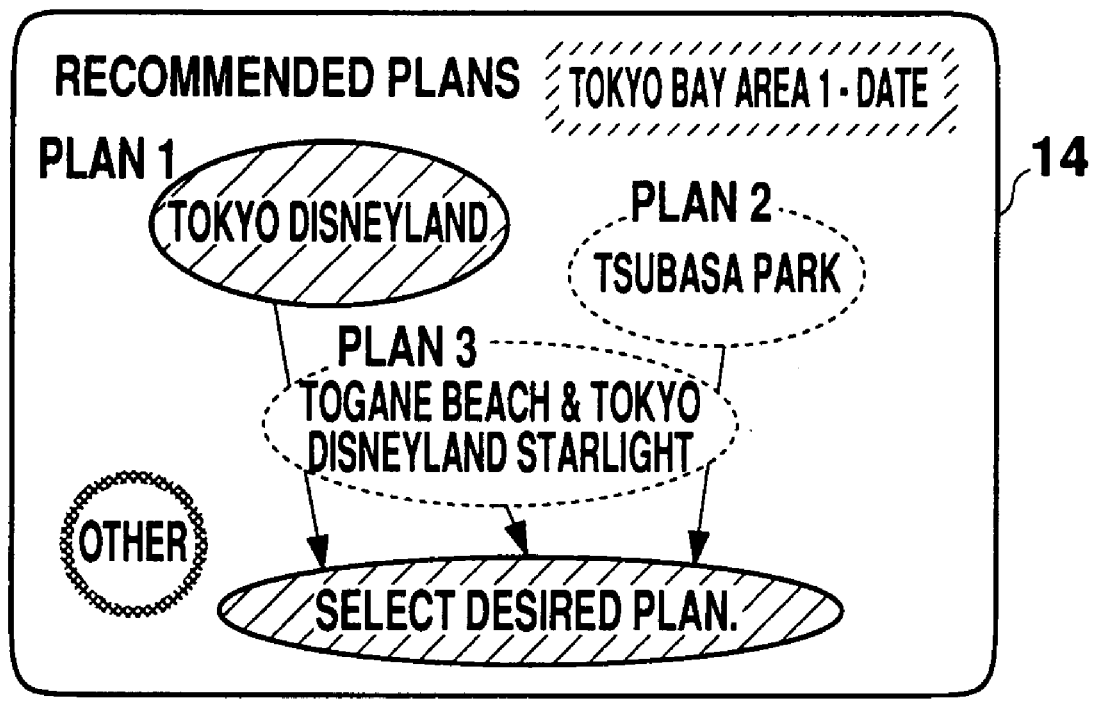
FIG. 16 shows an example screen display when multiple schedules exist.

When the plan choices transmitted from information processing center 200 are received (S203) at vehicle 100, information processor 10 displays (S204) the plans on display device 14. An example display is shown in FIG. 16. The plan choices transmitted from information processing center 200 are displayed as "recommended plans" in the form of touch switches. The user can select a desired plan (S205) by selecting one of these touch switches, and the selected information is transmitted (S206) to information processing center 200 through the antenna.

In addition to the touch switches for "recommended plans" shown in FIG. 16, a touch switch for "other" is displayed. If none of the 3 plans displayed on display device 14 are desired, actuation of the "other" touch switch permits other plan choices transmitted from information processing center 200 to be displayed and selected. Furthermore, the requirement that was set in S201 is displayed as a touch switch at the top right of display device 14 as shown in FIG. 16. If none of the plan choices transmitted from information processing center 200 are desired, actuation of this requirement touch switch returns the display to the requirement set-up screen shown in FIG. 3.

Then, when information processing center 200 receives the selected data transmitted from vehicle 100, the plan selected from among the plan choices is set when the schedule includes reservations, at service shops, for example, the plan is transmitted to the various information provider systems to make reservations, for example, at said service shops (S308).

Figure 17:
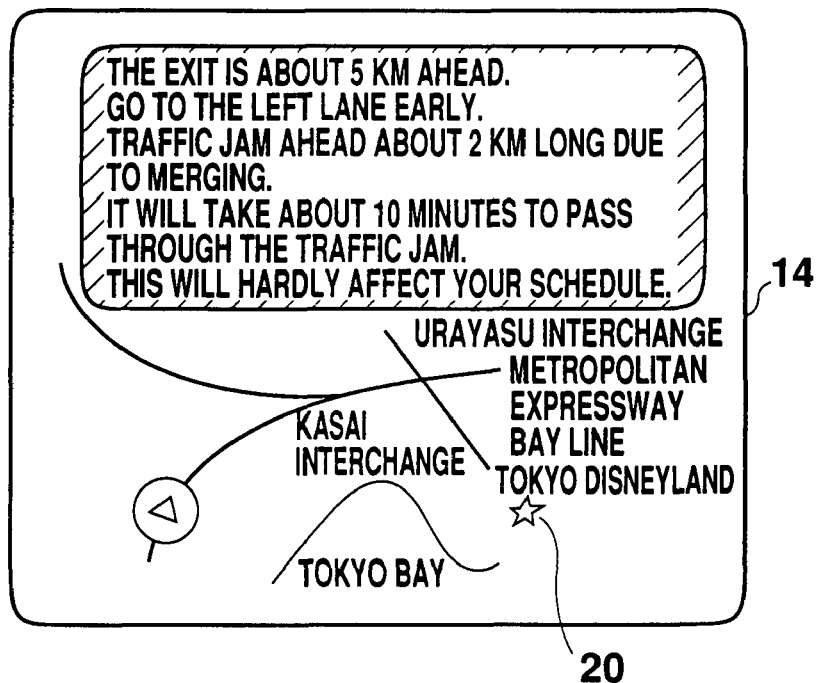
FIG. 17 shows an example screen display during route guidance.

Once the desired schedule is decided in the manner above, vehicle 100 starts traveling in accordance with the schedule. FIG. 15 shows the processing at vehicle 100 and information processing center 200 after vehicle 100 has started traveling in accordance with the selected schedule. First, when vehicle 100 begins the drive or journey, this start information is transmitted to information processing center 200 (S401). When the start information is received from vehicle 100 (S501) at information processing center 200, the watching of vehicle 100 starts (S502), and a verification with the schedule that was set up is performed (S503). FIG. 17 shows on example of a route guidance screen that is displayed by navigation system 4 on display device 14 in vehicle 100 after a drive is started. While vehicle 100 is traveling according to the schedule, information processing center 200 watches the current location of vehicle 100 at all times, and performs route guidance until the final location. In FIG. 17, the final location is indicated by an asterisk 20, and a message for route guidance is displayed as a message screen 22. This message screen 22 is not only displayed on display device 14, but may also be output as audio, such as from a speaker. Furthermore, although asterisk 20 was displayed as the final location, the user can also be informed of the position of the final location by displaying the latitude and longitude of the final location. An advantage in displaying the latitude and longitude of the final location is that the beeline distance from the current location can be easily established.

If a certain time period elapses (S504) while verification with the schedule is performed and the vehicle is guided to the final location in this manner, information processing center 200 transmits a request (S505) to vehicle 100 for vehicle position information. When vehicle 100 receives (S402) the request from information processing center 200, the position information of the vehicle is detected, such as by using the widely known GPS device, and transmitted (S403) to information processing center 200. Information processing center 200, which received (S506) the position information from the vehicle, then checks the weather and traffic information based on the information from the traffic & weather information provider system 300, and judges (S507) whether there is any change in the weather or traffic information. If there is no change in the weather or traffic information, vehicle 100 is guided according to the schedule that was initially set up. However, if there is a change in the weather or traffic information, for example, a sudden change to rainy weather or the occurrence of a traffic accident, the change is evaluated (S508) with regard to its degree of influence on the schedule. The degree of influence on the schedule depends on the contents of the schedule. A change from fine weather to rainy weather is a large influence when the final location is an outdoor facility, and a road traffic jam greatly influences a schedule for a final location for which the arrival time is important. On the other hand, for a schedule where it does not matter as long as the final location is reached sometime during a given day, a change in the weather or traffic information does not exert such a large influence. In such a case, the influence is judged to be nil so the processing from the S503 described above is continued. If it is judged that a change in the weather or traffic information will influence the schedule, modification information is transmitted (S509) to vehicle 100.

Figure 18:
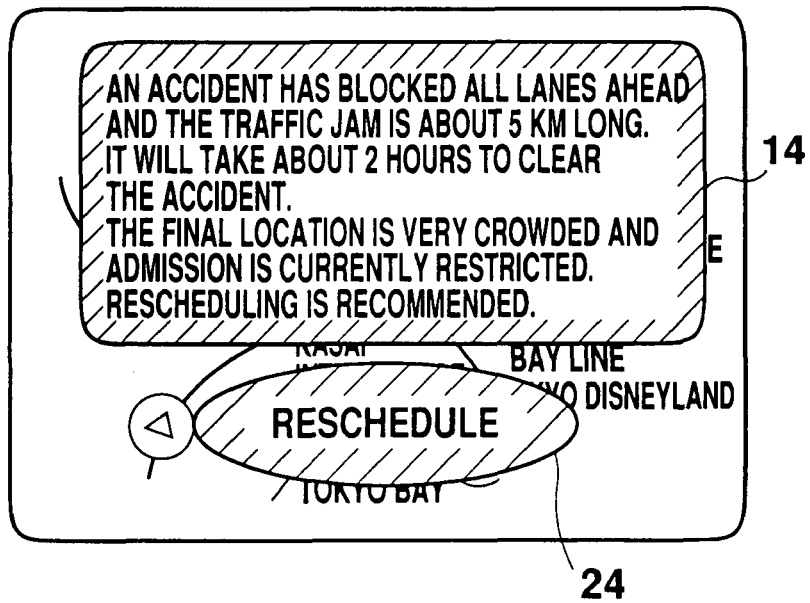
FIG. 18 shows an example screen display during re-scheduling.

When the modification information from information processing center 200 is received (S404) at vehicle 100, the modification information is displayed on the display device (S405). FIG. 18 shows one example of the modification information displayed on the display device. If there is no modification for the schedule, a message is displayed as shown in FIG. 17, such as "Traffic jam ahead about 2 km long due to merging. It will take about 10 minutes to pass through the traffic jam. This will hardly affect your schedule". However, for modification information, a message is displayed as shown in FIG. 18, such as "An accident has blocked all lanes ahead and the traffic jam is about 5 km long. It will take about 2 hours to clear the accident. The final location is very crowded and admission is currently restricted. Rescheduling is recommended.", and a touch switch 24 that prompts the traveler to reschedule is displayed. If the traveler actuates this reschedule touch switch 24 and desires to reschedule, a reschedule request is transmitted (S406) to information processing center 200.

Figure 19:
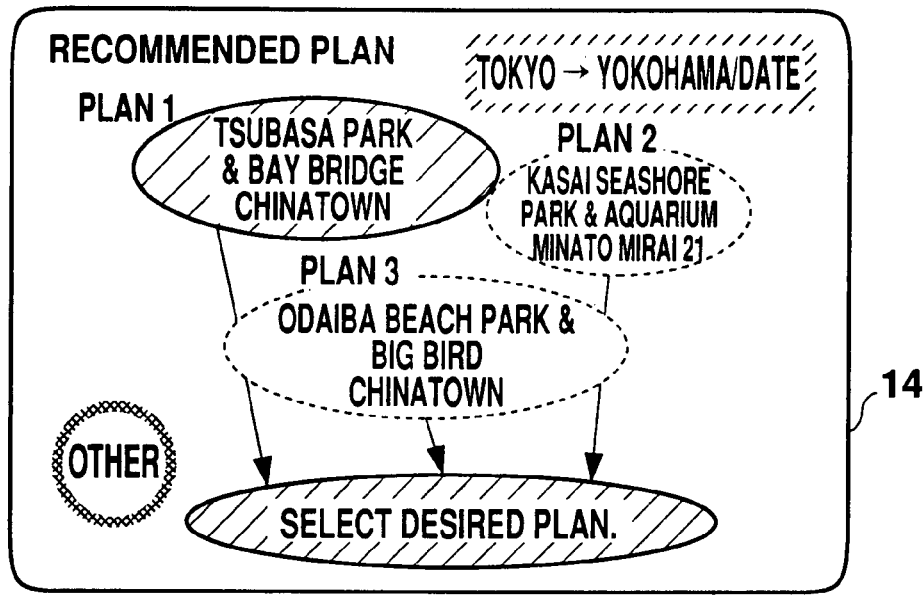
FIG. 19 shows an example screen display during schedule re-preparation.
Figure 20:
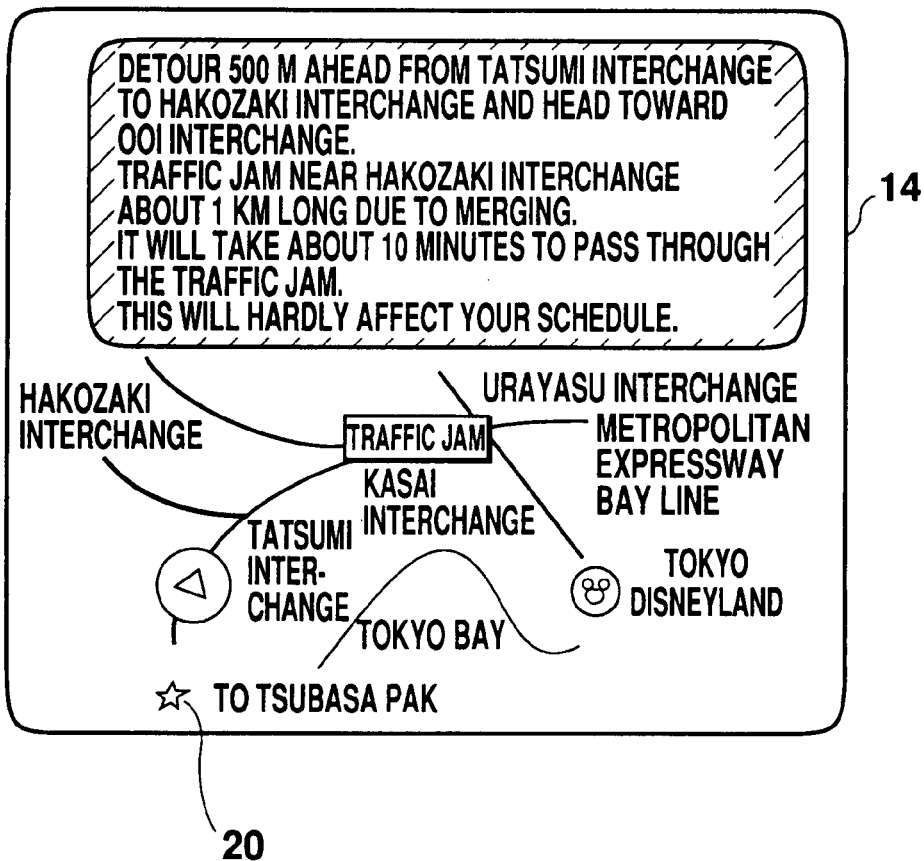
FIG. 20 shows a route guidance screen display after a re-schedule set-up.

Information is received from vehicle 100 at information processing center 200. If the received data is a modification request for the schedule, new plans fitting the current weather and traffic information are again prepared (S512) and transmitted to vehicle 100. When the new plan choices are received from the information processing center at vehicle 100, these plans are again displayed on the display device. One example of a reset plan transmitted from information processing center 200 is shown in FIG. 19, and, similar to the recommended plans shown in FIG. 16, the reset plan is displayed as a touch switch 26. As a result of the traveler selecting one of these plans, the schedule is reset (S512). Together with the resetting of the schedule, reservation cancellations are reported through the information provider system, such as to the service shops that were reserved according to the previous schedule. After the schedule is reset, the execution again transfers to the processing from S501, and vehicle 100 is guided to the final location while the current location of vehicle 100, the weather and traffic information, and so forth, are watched at all times. FIG. 20 shows one example of a route guidance screen displayed on the display device after the schedule is reset. The original final location is displayed small, and the asterisk is displayed at the new final location instead. If, for example, a road traffic jam exists that information is displayed on the display device and, by presenting a detour route avoiding the traffic jam, for example, the vehicle is safely guided to the final location.

In this manner, since a schedule fitting the requirements input by the traveler is automatically prepared at the information processing center and transmitted to the vehicle in this embodiment, the user can obtain an optimum schedule while in the vehicle. Furthermore, if conditions make it difficult to travel according to the original schedule, the degree of influence on the schedule is evaluated at the information processing center, and a substitute schedule to replace the presented schedule is prepared and transmitted to vehicle 100 so that an optimum plan fitting the current weather and traffic conditions can be obtained at all times to permit a smooth and comfortable drive to continue.

Although the aforementioned embodiments were given using the terminal device carried in the vehicle, it will be appreciated that this invention is also applicable to embodiments using a portable terminal.

A home or office personal computer may be used, or if the database can be installed in a high-capacity memory, the invention may also be applied to a stand-alone computer system.

What is claimed is:

1. A schedule-set-up management system comprising:
an inputting device for entering at least desired destination area information and desired time frame information;
a computer processor being configured to select, from a plurality of predetermined basic frame patterns, a basic frame of a schedule for visiting the desired destination area in the desired time frame, the selected basic frame of the schedule including a chronological sequence of events and types of intermediate and final locations in the desired destination area based on said destination area information and desired time frame information; and
schedule-preparing means for accessing a data base to retrieve specific facilities fitting said basic frame, thereby preparing a schedule in which intermediate and final locations are specified.

2. The schedule-set-up management system in accordance with claim 1:
wherein the display device displays a watch center for watching the implementation of said schedule, wherein said schedule-preparing means re-prepares a schedule based on information from said watching center.

3. The schedule-set-up management system in accordance with claim 1, wherein the inputting device and the computer processor are disposed in a terminal device, said schedule-preparing means disposed in a host device, said terminal device and host device are connected via a communication line, said terminal device transmits said selected basic frame to said host device, said host device transmits said schedule prepared by said schedule-preparing means to said terminal device.

4. The schedule-set-up management system in accordance with claim 3, wherein the inputting device is a display device and displays: a touch switch used for entering said destination information and desired arrival time information; said prepared basic frame; and said transmitted schedule.

5. The schedule-set-up management system in accordance with claim 1, further comprising:
route-searching means for searching an optimum route for carrying out said schedule using map data.

6. The schedule-set-up management system in accordance with claim 3, wherein said terminal device disconnects the communication line connecting with said host device after transmitting said basic frame, and reconnects the communication line connecting with said host device after completing the preparation of said schedule in order to receive said schedule.

7. The schedule-set-up management system in accordance with claim 2, wherein said schedule-preparing means evaluates the influence of the information supplied from said watching center of the implementation of said schedule, and again prepares a schedule based on evaluation results.

8. The schedule-set-up management system in accordance with claim 7, wherein said watching center has information-obtaining means for obtaining position information of a schedule implementer, information of the intermediate locations in said schedule and traffic information between the intermediate locations, the obtained information being supplied to said schedule-preparing mean.

9. The schedule-set-up management system in accordance with claim 8, wherein said information-obtaining means of said watching center further obtains weather information, and supplies the obtained weather information to said schedule-preparing means.

* * * * *

UNITED STATES PATENT AND TRADEMARK OFFICE
CERTIFICATE OF CORRECTION

PATENT NO. : 7,840,341 B1  Page 1 of 1
APPLICATION NO. : 08/750641
DATED : November 23, 2010
INVENTOR(S) : Koji Sato et al.

It is certified that error appears in the above-identified patent and that said Letters Patent is hereby corrected as shown below:

| Column | Line | |
|---|---|---|
| 9 | 17 | Change "on example" to --one example--. |
| 11 | 20 | Change "watch center" to --watching center--. |
| 12 | 22 | Change "claim 7" to --claim 2--. |
| 12 | 27 | Change "schedule-preparing mean" to --schedule-preparing means--. |

Signed and Sealed this
Fifth Day of April, 2011

David J. Kappos
*Director of the United States Patent and Trademark Office*